United States Patent
Marks et al.

(10) Patent No.: US 8,832,921 B2
(45) Date of Patent: Sep. 16, 2014

(54) LOCKING NUT ASSEMBLY FOR A CONE CRUSHER

(71) Applicant: Metso Minerals Industries, Inc., Waukesha, WI (US)

(72) Inventors: Walter R. Marks, Greendale, WI (US); Edward L. Snow, Racine, WI (US)

(73) Assignee: Metso Minerals Industries, Inc., Waukesha, WI (US)

( * ) Notice: Subject to any disclaimer, the term of this patent is extended or adjusted under 35 U.S.C. 154(b) by 14 days.

(21) Appl. No.: 13/768,860

(22) Filed: Feb. 15, 2013

(65) Prior Publication Data

US 2013/0152372 A1    Jun. 20, 2013

Related U.S. Application Data

(62) Division of application No. 13/178,701, filed on Jul. 8, 2011.

(51) Int. Cl.

| | | |
|---|---|---|
| B02C 17/08 | (2006.01) | |
| B23P 11/00 | (2006.01) | |
| B23P 17/00 | (2006.01) | |
| B23P 19/00 | (2006.01) | |
| F16B 37/08 | (2006.01) | |
| B24B 5/00 | (2006.01) | |
| B24B 29/00 | (2006.01) | |
| B02C 2/00 | (2006.01) | |
| F16B 39/12 | (2006.01) | |
| B02C 2/04 | (2006.01) | |

(52) U.S. Cl.
CPC ............... *F16B 39/12* (2013.01); *B02C 2/005* (2013.01); *B02C 2/04* (2013.01)
USPC ........... 29/525.02; 29/525.01; 29/525.11; 29/525.13; 29/281.1; 29/456; 241/207; 411/14.5; 411/432; 411/433; 269/309; 269/310; 451/285; 451/286

(58) Field of Classification Search
USPC ............. 29/525.01, 525.02, 525.11, 525.13, 29/456, 255, 244, 281.1; 254/100, 103, 254/133 R, 134; 241/207; 411/14.5, 432, 411/433; 269/32, 24, 309, 310; 451/285–288
See application file for complete search history.

(56) References Cited

U.S. PATENT DOCUMENTS

| | | |
|---|---|---|
| 2,438,744 A | 3/1948 | Flynn |
| 2,571,265 A | 10/1951 | Leufven |
| 3,129,629 A | 4/1964 | Hartig |

(Continued)

*Primary Examiner* — Essama Omgba
*Assistant Examiner* — Darrell C Ford
(74) *Attorney, Agent, or Firm* — Andrus Intellectual Property Law, LLP

(57) ABSTRACT

A two-piece locking nut assembly for securing a mantle to a head assembly of a cone crusher. The two-piece locking nut assembly includes an inner nut and an outer nut. The inner nut includes a set of axial bores that each receive a jackscrew. Once the locking nut assembly is in position on the head assembly, the series of jackscrews are tightened to exert a force on the mantle that is counteracted by forces through the inner nut and into the head to create a locking force between the locking nut assembly and the head assembly. The outer nut is turned along the inner nut to hold the locking nut assembly in place. Once the outer nut is moved into position, the jackscrews are removed such that the outer nut continues to apply the locking force between the mantle and the head through the locking nut assembly.

15 Claims, 8 Drawing Sheets

(56) References Cited

U.S. PATENT DOCUMENTS

| | | | |
|---|---|---|---|
| 3,734,418 A * | 5/1973 | Johnson | 241/207 |
| 3,877,706 A * | 4/1975 | Haas et al. | 277/366 |
| 4,012,000 A * | 3/1977 | Davis et al. | 241/290 |
| 4,168,036 A | 9/1979 | Werginz | |
| 4,245,792 A | 1/1981 | Ivanov et al. | |
| 4,338,037 A * | 7/1982 | Deminski | 403/24 |
| 4,697,745 A * | 10/1987 | Sawant et al. | 241/30 |
| 4,717,084 A * | 1/1988 | Vendelin et al. | 241/207 |
| 4,927,305 A | 5/1990 | Peterson, Jr. | |
| 5,046,906 A | 9/1991 | Bucknell | |
| 5,069,587 A * | 12/1991 | Levenstein | 411/432 |
| 5,163,213 A | 11/1992 | Brizendine | |
| 5,253,967 A | 10/1993 | Orban et al. | |
| 5,472,245 A * | 12/1995 | Meske et al. | 285/414 |
| 5,662,445 A * | 9/1997 | Harbottle et al. | 411/433 |
| 5,735,655 A * | 4/1998 | Callan et al. | 411/291 |
| 5,846,042 A | 12/1998 | Iannuzzi | |
| 5,850,978 A | 12/1998 | Jacobson | |
| 5,927,917 A | 7/1999 | Gibbons | |
| 6,065,737 A | 5/2000 | Richardson et al. | |
| 6,077,008 A | 6/2000 | Elgh | |
| 6,263,764 B1 | 7/2001 | Steinbock | |
| 6,299,083 B1 | 10/2001 | Polinski et al. | |
| 6,604,699 B1 | 8/2003 | Polinski et al. | |
| 6,685,406 B2 | 2/2004 | Whitney et al. | |
| 7,008,156 B2 | 3/2006 | Imai et al. | |
| 7,104,482 B2 * | 9/2006 | Juhlin | 241/207 |
| 7,290,560 B2 | 11/2007 | Orr et al. | |
| 7,673,849 B2 | 3/2010 | Britton et al. | |
| 7,775,559 B2 * | 8/2010 | Steinbock et al. | 285/90 |
| 8,602,340 B2 * | 12/2013 | Berton | 241/293 |
| 8,622,377 B2 * | 1/2014 | Konrad et al. | 269/287 |
| 2004/0035967 A1 * | 2/2004 | Johnson et al. | 241/207 |
| 2005/0166385 A1 * | 8/2005 | Steinbock et al. | 29/452 |
| 2006/0086852 A1 * | 4/2006 | Juhlin | 241/207 |
| 2006/0278745 A1 * | 12/2006 | Juhlin | 241/101.2 |
| 2011/0084156 A1 * | 4/2011 | Martinez et al. | 241/207 |
| 2011/0192927 A1 * | 8/2011 | Biggin et al. | 241/213 |
| 2013/0327865 A1 * | 12/2013 | Boast et al. | 241/278.1 |

* cited by examiner

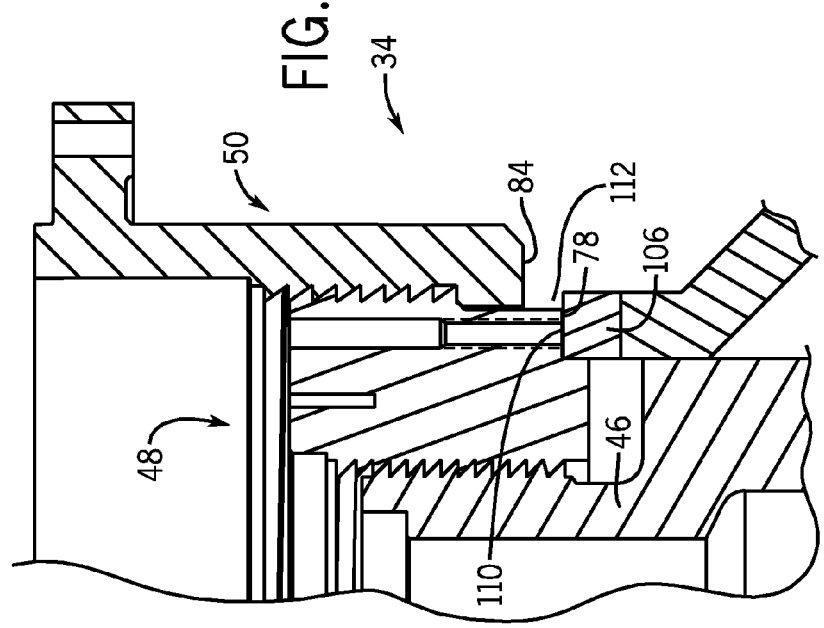
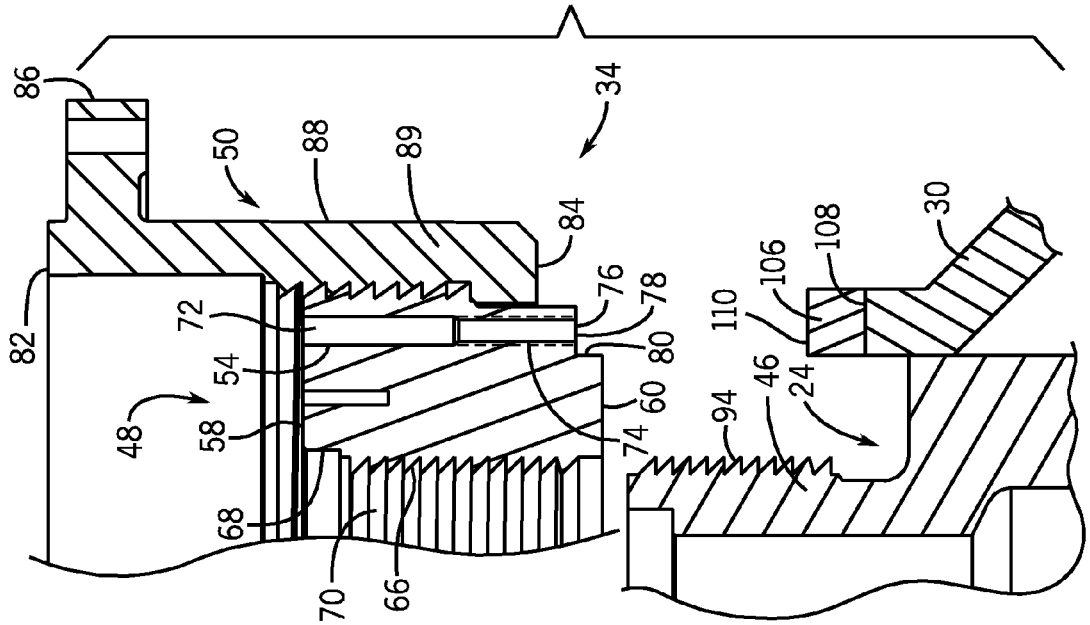

LOCKING NUT ASSEMBLY FOR A CONE CRUSHER

CROSS REFERENCE TO RELATED APPLICATION

This application is a divisional application of prior U.S. patent application Ser. No. 13/178,701, filed on Jul. 8, 2011, entitled LOCKING NUT ASSEMBLY FOR A CONE CRUSHER.

BACKGROUND OF TUE INVENTION

The present disclosure generally relates to rock crushing equipment. More specifically, the present disclosure relates to a locking nut assembly for use with a cone crusher that facilitates installation and/or replacement of mantles on the head assembly of the cone crusher.

Presently, rock crushing systems, such as those referred to as cone crushers, generally break apart rock, stone or other material in a crushing cavity between a stationary element and a moving element. For example, a conical rock crusher is comprised of a head assembly including a crushing head that gyrates about a vertical axis within a stationary bowl supported by the adjustment ring of the rock crusher. The crushing head assembly surrounds an eccentric that rotates about a fixed shaft to impart the gyrational movement of the crushing head assembly which crushes rock, stone or other material in a crushing gap between a mantle on the crushing head assembly and a bowl liner on the bowl assembly.

The exterior of the conical head assembly is covered with a protective wear-resistant mantle that engages the material that is being crushed, such as rock, stone, mineral or other substances. During use of the cone crusher, the mantle resists the wear imparted through the crushing action of the cone crusher. After a period of use, a worn mantle can be removed and replaced with a new mantle.

Typically, a locking nut is used to forcibly secure the mantle to the crushing head assembly by applying a large downward force on the top of the mantle. The locking nut includes an internally threaded surface that engages an externally threaded surface on the head assembly. In conventional crushers, downward force is applied to the mantle by screwing down the internally threaded locking nut on the mating threads of the externally threaded head assembly. The turning effort is typically applied by a special wrench having a protruding arm. The large amount of turning effort that is needed to tighten down the locking nut often requires the use of difficult mechanical operations to create the sufficient locking force to adequately secure the mantle on the head assembly.

SUMMARY OF THE INVENTION

The present disclosure generally relates to a method and system for securing a mantle to a head assembly of rock crushing equipment. More specifically, the present disclosure relates to a locking nut assembly for use with a cone crusher that allows the connection of a mantle to the head assembly of the cone crusher.

The locking nut assembly of the present disclosure includes an inner nut that has a threaded inner surface, a threaded outer surface and a series of axial bores that extend from an annular top face to an annular bottom face of the inner nut. The threaded outer surface of the annular inner nut receives a corresponding series of threads formed along an inner surface of an outer nut. The threaded interaction between the inner and outer nuts allows the outer nut to move relative to the inner nut upon rotation of the outer nut relative to the inner nut.

The series of axial bores formed in the inner nut receive a corresponding series of jackscrews. Each jackscrew includes a threaded portion that is received in a threaded section of the annular bore. The threaded interaction between the annular bores of the inner nut and the jackscrews allow the jackscrews to be rotated and moved relative to the inner nut.

In some embodiments of locking nut assembly, during initial assembly the inner and outer nuts are staged relative to each other before the staged combination is positioned on the head assembly. In one configuration, the outer nut is supported on blocks and the inner nut is positioned within the outer nut and turned down as far as possible with respect to the outer nut.

In another alternate configuration, the inner nut could be supported and the outer nut turned down along the inner nut. In each of these configurations, the inner and outer nuts are staged relative to each other before installation.

Once the inner and outer nuts are staged relative to each other, the combination of the inner and outer nuts is positioned such that the inner threads of the inner nut engage a threaded portion of the head assembly. In one contemplated embodiment, the inner nut is turned down on the threaded portion of the head assembly until a jackscrew exit surface of the inner nut engages a torch ring positioned on the mantle. In an alternate embodiment, the inner nut is turned down along the threaded portion of the head assembly only far enough to leave a small space or gap between the jackscrew exit surface and the torch ring.

Although a torch ring is used in several embodiments of the disclosure, it is contemplated that the torch ring could be eliminated. In such an embodiment, the inner nut is turned down until the inner nut either engages the mantle directly or is spaced slightly above the mantle.

After the inner nut is moved into the desired position, each of the set of jackscrews are installed in an axial bore. In the embodiment including a conventional torch ring, the jackscrews are each rotated until a contact end of each of the jackscrews contacts the torch ring. Each jackscrew is rotated further such that the torch ring is moved away from the inner nut and the set of jackscrews combine to exert a downward force on the torch ring which is opposed by the reactionary locking force between the inner nut and the head assembly. Preferably, the jackscrews are tightened incrementally in a star pattern to exert an evenly applied downward force on the mantle. In the contemplated embodiment in which the torch ring is eliminated, the jackscrews contact the mantle directly.

Once the jackscrews are properly torqued, the outer nut is rotated on the threaded interface with the inner nut until the bottom face surface of the outer nut engages the torch ring. When the bottom face surface engages the torch ring, the outer nut is in the proper holding position. In the contemplated embodiment in which the torch ring is eliminated, the outer nut is rotated into direct contact with the mantle.

Once the outer nut is in the proper holding position, each of the jackscrews can be removed such that the outer nut holds the locking nut assembly in place. Preferably, the jackscrews are removed in an incremental star pattern to avoid creating overloads on the last jackscrews to be removed. The jackscrews are removed from the inner nut to avoid damage that can occur to the jackscrews during use of the crusher. The relatively small area of surface contact between the jackscrews and the torch ring can damage the jackscrews if the jackscrews are left in place during operation of the crusher. When the outer nut is in the proper position and the jackscrews removed, the reactionary locking force is now created by the outer nut rather than the jackscrews. In this manner, the jackscrews are inserted to create the locking force and removed once the outer nut is tightened down into contact with the torch ring or mantle.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 4 is a partial section view of the locking nut assembly prior to installation on the head assembly of the cone crusher;

FIG. 5 is a partial section view illustrating the initial position of the locking nut assembly on the head assembly;

DETAILED DESCRIPTION OF THE INVENTION

Figure 1:
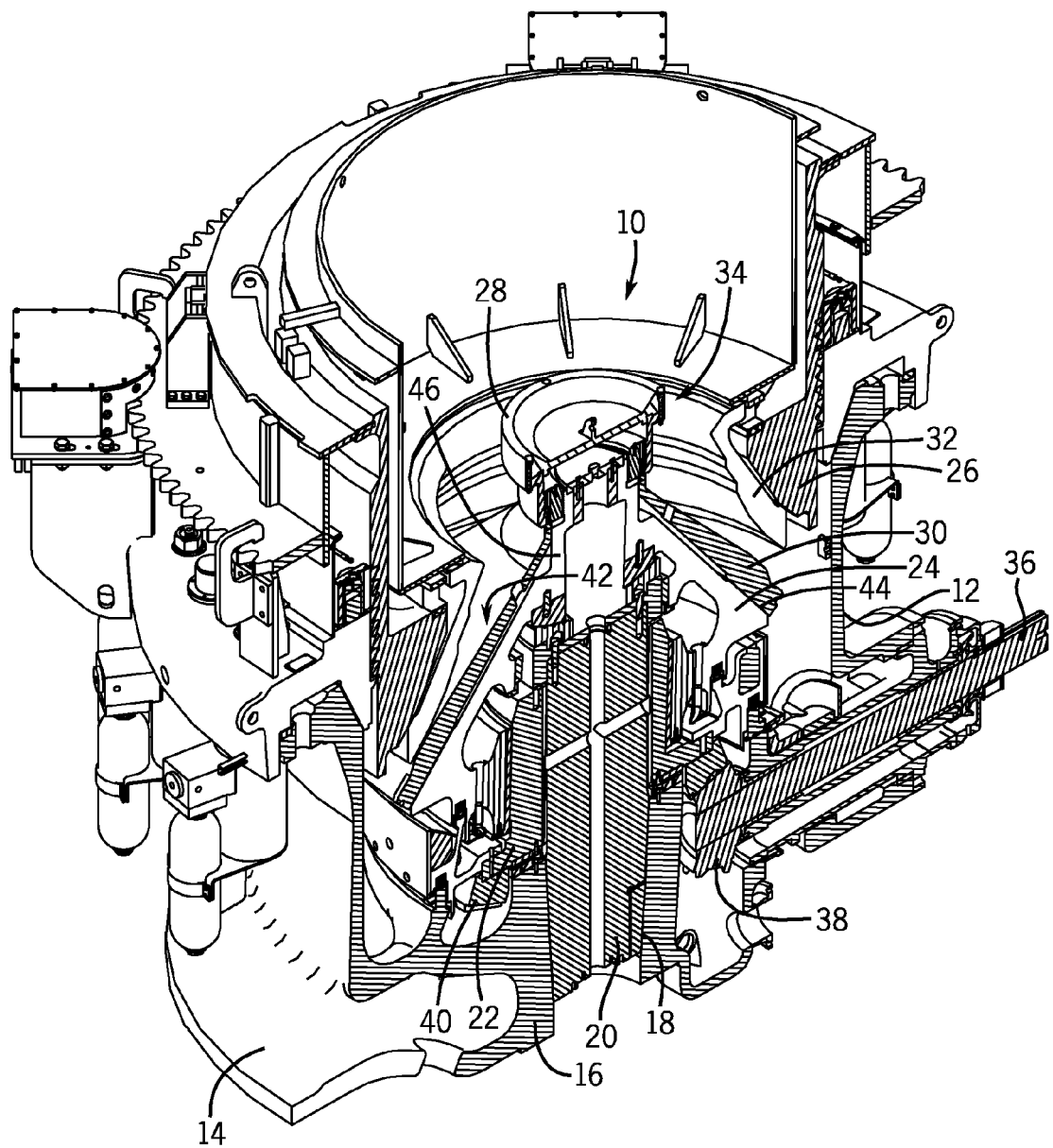
FIG. 1 is a partial section view of a cone crusher including the locking nut assembly of the present disclosure.

FIG. 1 illustrates a cone crusher 10 that is operable to crush material, such as rock, stone, or mineral or other substances. The cone crusher 10 includes a mainframe 12 having a lower flange 14. The cone crusher 10 can be any size rock crusher or include any type of crusher mantle. Lower flange 14 rests upon a platform-like foundation that can include concrete piers (not shown), a foundation block, a steel platform or other supporting member. A central hub 16 of the mainframe 12 includes an upwardly diverging tapered bore 18. The bore 18 is adapted to receive a main shaft 20.

An eccentric 22 surrounds the main shaft 20 and is coupled to a head assembly 24. The eccentric 22 rotates about the main shaft 20, thereby causing the head assembly 24 to gyrate within the cone crusher 10. Gyration of the head assembly 24 within a bowl 26 allows rock, stone, ore, minerals or other materials to be crushed between a mantle 30 and a bowl liner 32. The mantle 30 is a removable component that is held in place on the head assembly 24 by a locking nut assembly 34 of the present disclosure. The locking nut assembly 34 in the embodiment shown receives a feed plate 28 that can also be replaced when worn.

As can be understood in FIG. 1, when the cone crusher 10 is operating, countershaft 36 rotates the eccentric 22 through the interaction between a pinion 38 and a gear 40. The rotation of the eccentric 22 creates the gyrational movement of the head assembly 24 within the stationary bowl 26. The gyrational movement of the head assembly 24 allows the material to be crushed to enter into the crushing gap 42. Further rotation of the eccentric 22 reduces the crushing gap 42 on this material and forcefully fractures some of the particles being crushed by the cone crusher 10. The cone crusher 10 can be one of many different types of cone crushers available from various manufacturers, such as Metso Minerals of Milwaukee, Wis. As an example, the cone crusher 10 shown in FIG. 1 can be an MP® series rock crusher, such as the MP800, MP1000 and MP1250 available from Metso Minerals Industries. Inc. However, different types of cone crushers could be utilized while operating within the scope of the present disclosure.

Although the locking nut assembly 34 is shown in the drawing figures as being used with a cone crusher, it is contemplated by the inventors that the concept of the present disclosure could be extended to other types of cone crushers and possibly used for the installation of mantles on the main shafts of gyratory crushers. The design concept could be extended to other types of crushers that use locking bolts instead of locking nuts to hold the replaceable mantle in place along a head assembly.

During operation of the cone crusher 10 with the material being crushed, the crushing forces created in the crushing gap 42 exert a force against the mantle 30 of the head assembly 24. As illustrated in FIG. 1, the mantle 30 is a removable component of the cone crusher 10 such that the mantle 30 can be replaced when worn. In addition, the bowl liner 32 is also a removable component that can be removed and replaced when worn.

As can be understood in FIG. 1, the mantle 30 rests upon a sloped outer surface 44 of the head assembly 24. The mantle 30 is securely held in position along the outer surface 44 by the locking nut assembly 34 of the present disclosure. The locking nut assembly 34 is received on an upper attachment portion 46 of the head assembly 24 in a manner that will be described in greater detail below. The locking nut assembly 34 receives the feed plate 28 which protects the locking nut assembly 34 from incoming material to be crushed. The feed plate 28 can be removed and replaced as required.

Figure 2:
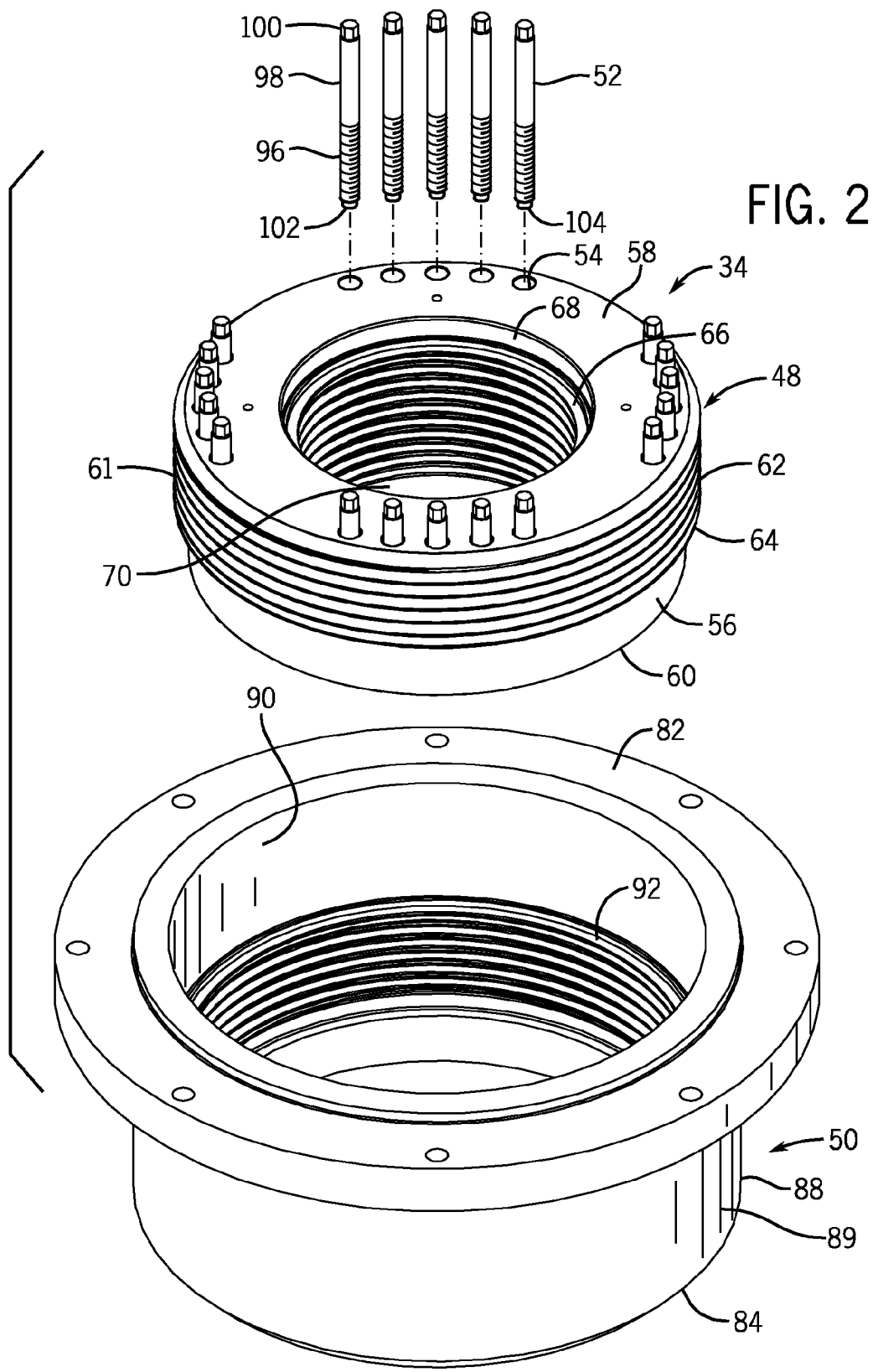
FIG. 2 is an exploded perspective view of the locking nut assembly.
Figure 3:
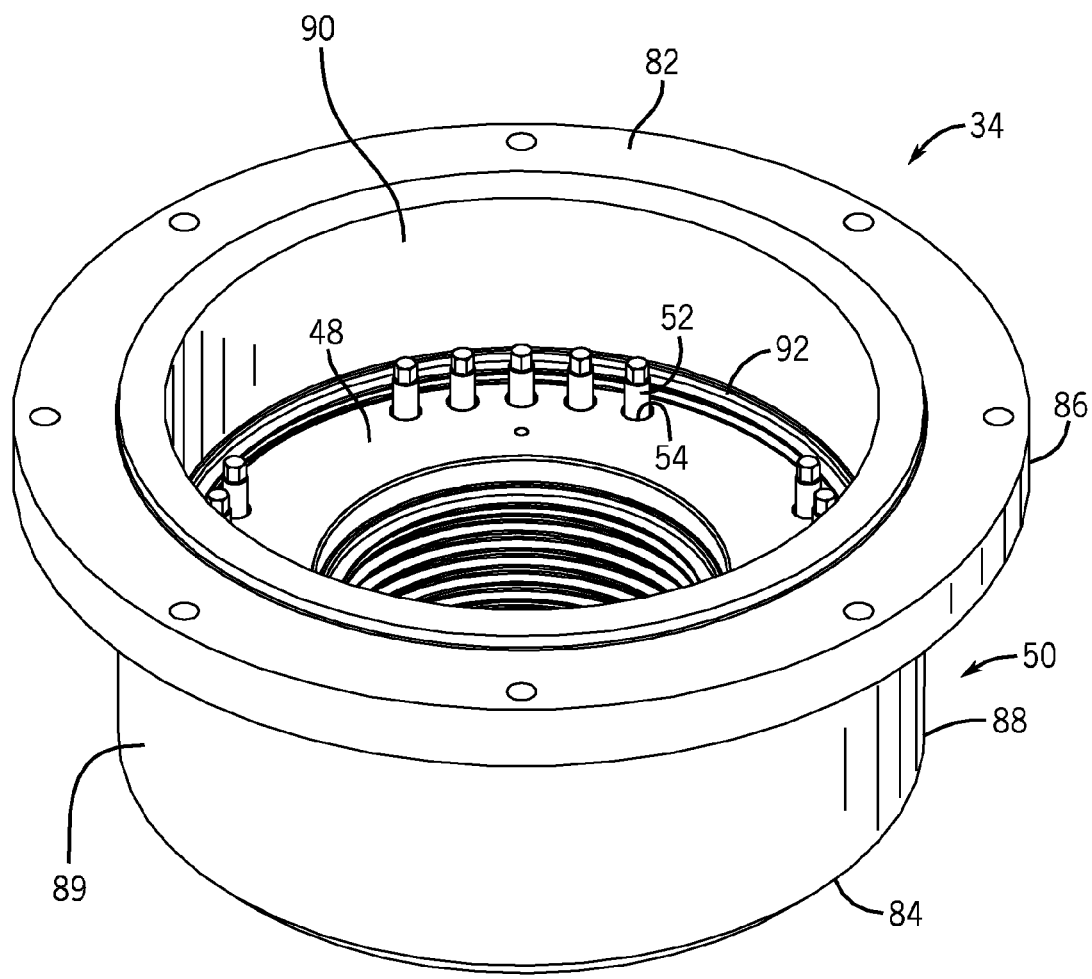
FIG. 3 is a perspective, assembled view of the inner and outer nuts with the jackscrews installed.

FIGS. 2 and 3 illustrate the locking nut assembly 34 of the present disclosure. As shown in FIG. 2, the locking nut assembly 34 generally includes an inner nut 48, an outer nut 50 and a set of jackscrews 52. When the locking nut assembly 34 is in the assembled condition of FIG. 3, the inner nut 48 is received within the outer nut 50 and each of the jackscrews 52 are received in one of a set of axial bores 54 formed in the inner nut 48.

Referring now to FIGS. 2 and 4, the inner nut 48 generally includes a main body 56 that has a generally annular shape. The main body 56 extends from a top face surface 58 to a bottom face surface 60. The inner nut 48 includes an outer surface 61 having a first series of threads 62. The first series of threads 62 extends along the outer surface 61 from the top face surface 58 to a lower shoulder 64. In the embodiment shown in FIG. 2, the lower shoulder 64 is spaced from the bottom face surface 60.

The inner nut 48 further includes a second series of threads 66 that are formed along an inner surface 68 of the inner nut 48. The second series of threads 66 extends along the inner surface 68 from a location near the top face surface 58 to the bottom face surface 60. As illustrated in FIGS. 2 and 4, the inner surface 68 defines an annular opening 70 that is sized to receive the attachment portion 46 of the head assembly 24. When the locking nut assembly is used on a crusher that uses a locking bolt rather than a locking nut to hold the mantle in place along the head assembly, the inner nut will be configured differently such that the second series of threads engage internal threads of the head assembly. Thus, it should be understood that the locking nut assembly shown and described could be reconfigured to be a locking bolt such that the assembly of the present disclosure can be used on different types of crushers.

Referring back to FIG. 2, the inner nut 48 includes a series of axial bores 54 that each extend through the main body 56 of the inner nut 48 from the top face surface 58. As shown in FIG. 4, each of the axial bores 54 includes an upper portion 72 and a threaded lower portion 74. In the embodiment shown in FIG. 4, the threaded lower portion 74 terminates at a lower opening 76 that is formed in a jackscrew exit surface 78 of the inner nut 48. The jackscrew exit surface 78 is recessed slightly from the bottom face surface 60 and is defined by a shoulder 80. In an alternate embodiment, the axial bore 54 could be threaded along its entire length.

Referring back to FIGS. 2 and 3, the locking nut assembly 34 further includes the outer nut 50. The outer nut 50 extends from a top face surface 82 to a bottom face surface 84. In the embodiment shown in FIGS. 2-11, the top face surface 82 is formed as part of an attachment flange 86 that extends outward past the outer surface 88 of the lower portion 89. However, in contemplated alternate embodiments, the attachment flange 86 could be eliminated from the outer nut 50, as shown in the alternate configuration of FIG. 12.

The inner surface 90 of the outer nut 50 includes a series of threads 92 formed along at least a portion of the inner surface 90. The series of threads 92 on the outer nut 50 are configured to interact with the first series of threads 62 formed on the outer surface of the inner nut 48. As can be understood in FIGS. 3 and 4, the threaded interaction between the first series of threads 62 formed on the outer surface of the inner nut 48 and the series of threads 92 formed along the inner surface 90 of the outer nut allows for relative movement between the inner and outer nuts 48, 50 upon rotation of either component. As will be described in detail below, when the inner nut 48 is stationary and the outer nut 50 rotated, the outer nut 50 will move either upward or downward relative to the inner nut 48 depending upon the direction of rotation of the outer nut 50.

Referring back to FIG. 2, the locking nut assembly 34 further includes a set of jackscrews 52 that are each received within one of the axial bores 54. Each of the jackscrews 52 includes a threaded portion 96, an unthreaded shank 98, an engagement end 100 and a contact end 102. Although the embodiment shown includes an unthreaded shank 98, it is contemplated that the threads could extend along the entire length of the jackscrew 52. The engagement end 100 is configured in the embodiment shown in FIG. 2 as having a series of flat side surfaces such that the engagement end 100 can receive a wrench socket for rotating the jackscrew 52. The contact end 102 includes a generally flat bottom surface 104. In the embodiment shown in FIG. 2, each of the jackscrews 52 is formed from machined steel such that the jackscrews 52 have the required strength for exerting relatively large forces on the mantle, possibly through a torch ring of the cone crusher without excessive deformation.

As shown in FIG. 2, in the embodiment of the locking nut assembly 34 illustrated, the locking nut assembly 34 includes twenty jackscrews 52 spaced around the main body of the inner nut 48. In the embodiment illustrated, the jackscrews are grouped in four groups of five jackscrews, where each group of jackscrews is centered at 90° intervals around the annular inner nut 48. Although this configuration of the jackscrews 52 is shown in the preferred embodiment, it should be understood that a different number of jackscrews 52 could be used or that the jackscrews 52 could be located in other configurations while operating within the scope of the present disclosure. Although other configurations of the jackscrews 52 are contemplated, it is desirable that the jackscrews be spaced around the entire circumference of the inner nut such that the combination of the spaced jackscrews 52 will exert a relatively uniform force when the jackscrews are individually tightened in the manner to be described below.

Referring now to FIG. 4, in the embodiment illustrated, the lower portion 74 of each axial bore 54 includes a series of threads that engage the external threads formed on the threaded portion 96 of the jackscrew 52 (see FIG. 2). Thus, rotation of the jackscrew 52 within the axial bore 54 causes the jackscrew to move relative to the inner nut 48.

In the embodiment shown in FIG. 4, the locking nut assembly 34 further includes a torch ring 106. The torch ring 106 is positioned on a top rim 108 of the mantle 30. The torch ring 106 provides a surface 110 for contact with the inner nut 48, the jackscrews 52 and the outer nut 50 as will be described in greater detail below. The expendable torch ring 106 is typically destroyed during removal of a worn mantle and is replaced when a new mantle is installed.

Referring now to FIGS. 4-10, the sequence of operation required to utilize the locking nut assembly 34 of the present disclosure to secure the mantle 30 to the head assembly 24 will now be described. Referring first to FIG. 4, before the locking nut assembly 34 is installed onto the head assembly 24, the inner and outer nuts 48, 50 are initially staged relative to each other. In a first implementation of the staging process, the outer nut 50 is supported on blocks. Once the outer nut 50 is supported, the inner nut 48 is positioned within the open interior until the external threads of the inner nut engage the internal threads of the outer nut. The inner nut 48 is then turned down along the outer nut 50 until the jackscrew exit surface 78 of the inner nut reaches the elevation of the bottom face surface 84.

Figure 12:
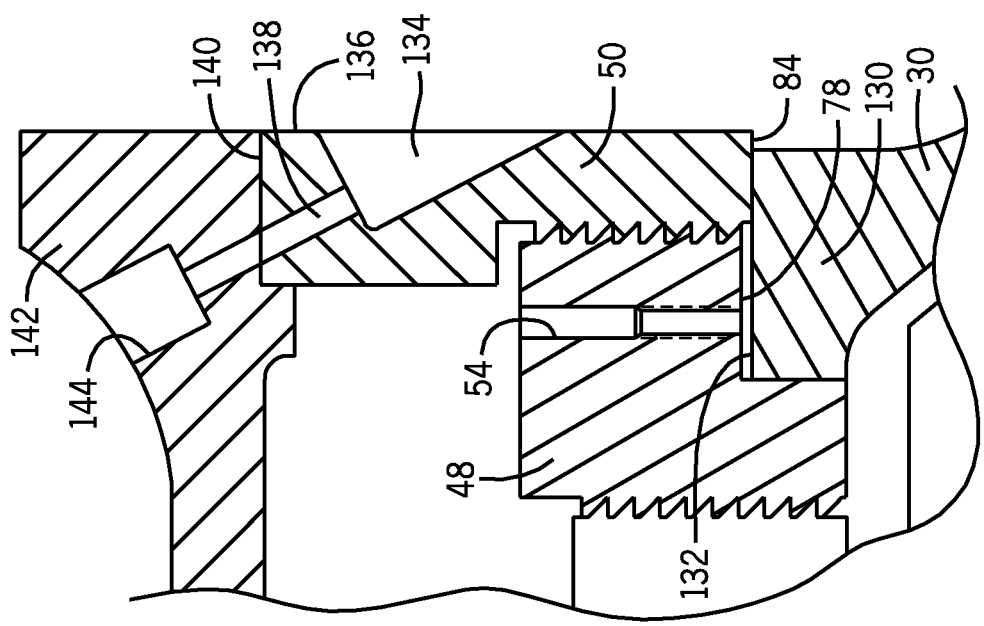
FIG. 12 is a section view of another alternate embodiment of the mantle and locking nut assembly.

If the inner and outer nuts 48, 50 have different configurations than shown in FIGS. 4-10, such as shown in FIG. 12, the staging sequence may be altered or even eliminated. To stage the embodiment shown in FIG. 12, the inner nut 48 is supported on blocks and the outer nut 50 turned down along the inner nut 48. Alternatively, the inner nut 48 shown in FIG. 12 could be initially attached to the head assembly and the outer nut 50 turned down the inner nut 48.

Once the inner and outer nuts 48, 50 have been staged as shown in FIG. 4, the mantle 30 and torch ring 106 are positioned on the head assembly 24. After the new mantle 30 and torch ring 106 are positioned, the staged locking nut assembly 34 is positioned in alignment with the attachment portion 46 of the head assembly 24. Once positioned as shown in FIG. 4, the locking nut assembly 34 is lowered until the threads 66 formed along the inner surface 68 of the inner nut 48 engage the external threads 94 formed on the attachment portion 46 of the head assembly 24. Once the threads engage, the combination of the inner and outer nuts are turned down along the attachment portion 46 until the jackscrew exit surface 78 of the inner nut 48 engages the top surface 110 of the torch ring 106, as illustrated in FIG. 5. When the jackscrew exit surface 78 of the inner nut 48 engages the top surface 110 of the torch ring 106, the bottom face surface 84 of the outer nut 50 is spaced from the top surface 110 by a gap 112. The gap 112 allows for confirmation that the inner nut 48 has properly seated on the torch ring 106. In the embodiment shown in FIGS. 4 and 5, the combination of the inner and outer nuts, 48, 50 are manually turned down the attachment portion 46 through use of a pry bar used in conjunction with part features and accessories.

Figure 6:
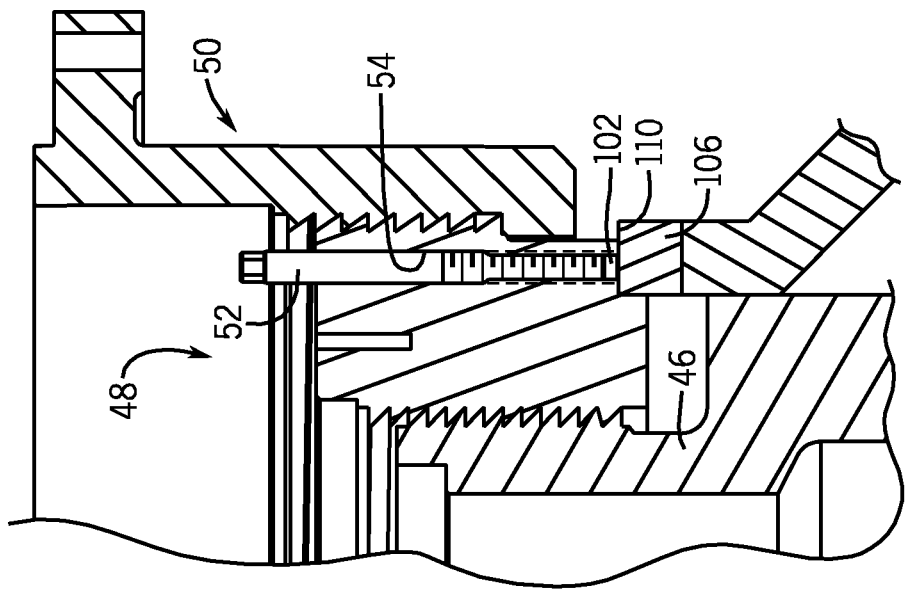
FIG. 6 is a partial section view illustrating the position of the jackscrews within the inner nut of the locking nut assembly.

Referring now to FIG. 6, once the inner nut 48 is turned down into contact with the top surface 110 of the torch ring 106, the set of jackscrews 52 are each inserted into the axial bores 54. Each of the jackscrews 52 is then rotated within the axial bore 54 until the contact end 102 engages the top surface 110 of the torch ring 106.

Once the contact end 102 engages the top surface 110 of the torch ring 106, each of the jackscrews is torqued using a mechanical tightening device. In the preferred embodiment of the disclosure, the series of jackscrews are preferentially incrementally tightened in a star pattern, similar to tensioning lug nuts on an automobile wheel. As an illustrative example, the jackscrews shown in FIG. 2 are grouped into four groups, each group having five jackscrews. The groups can be labeled A, B, C and D, with A opposite B, and each jackscrew in the respective group numbered 1-5 in a consistent direction around the locking nut assembly 34. During initial tightening, the jackscrews are tightened in the sequence A1, B1, C1, D1/A2, 132, C2, D2/A3, B3, C3, D3, etc.

After all of the jackscrews are initially tightened, an operator repeats the sequence above to tighten the jackscrews to a final tension. As each of the jackscrews 52 are torqued, the jackscrews 52 push the mantle downward with the torch ring, creating or increasing a gap 114 shown in FIG. 7 between the jackscrew exit surface 78 of the inner nut 48 and the top surface 110 of the torch ring 106.

Figure 7:
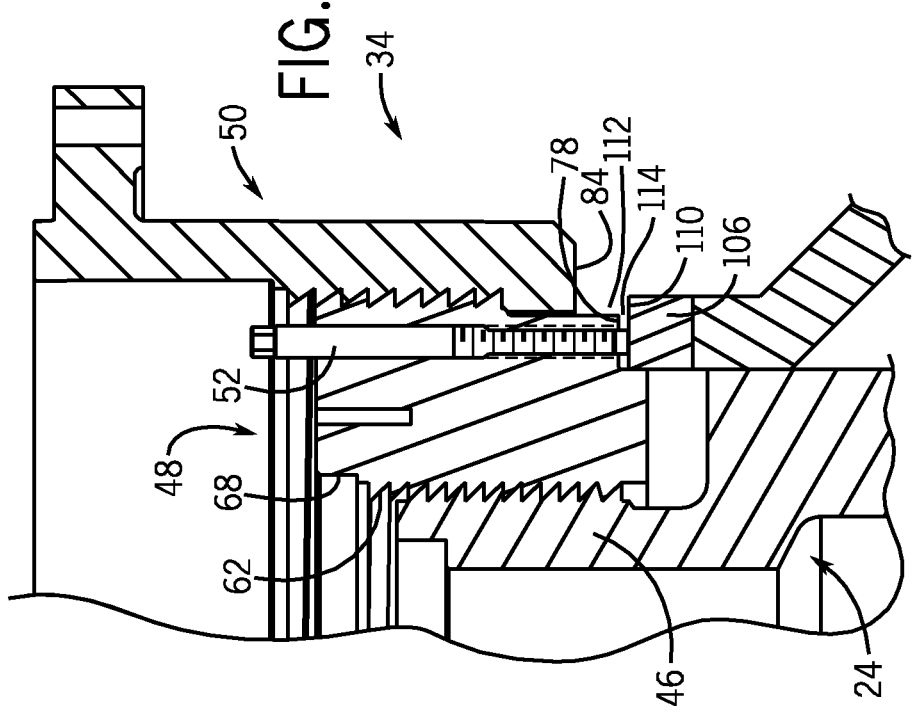
FIG. 7 is a partial section view illustrating the tightening of the jackscrews to create the locking force.

As the jackscrews are torqued, the gap 112 between the bottom face surface 84 of the outer nut 50 and the top surface 110 of the torch ring 106 also increases, as can be seen in the comparison between FIGS. 6 and 7. The continued torquing of each of the jackscrews 52 creates a locking force that is seen between the threads 62 formed along the inner surface 68 of the inner nut 48 and the external threads formed on the attachment portion 46 of the head assembly 24. As can be understood in FIG. 7, the summed forces of the jackscrews 52 create the total locking force rather than the need to rotate the entire locking nut assembly 34 about the attachment portion 46 of the head assembly 24.

Figure 8:
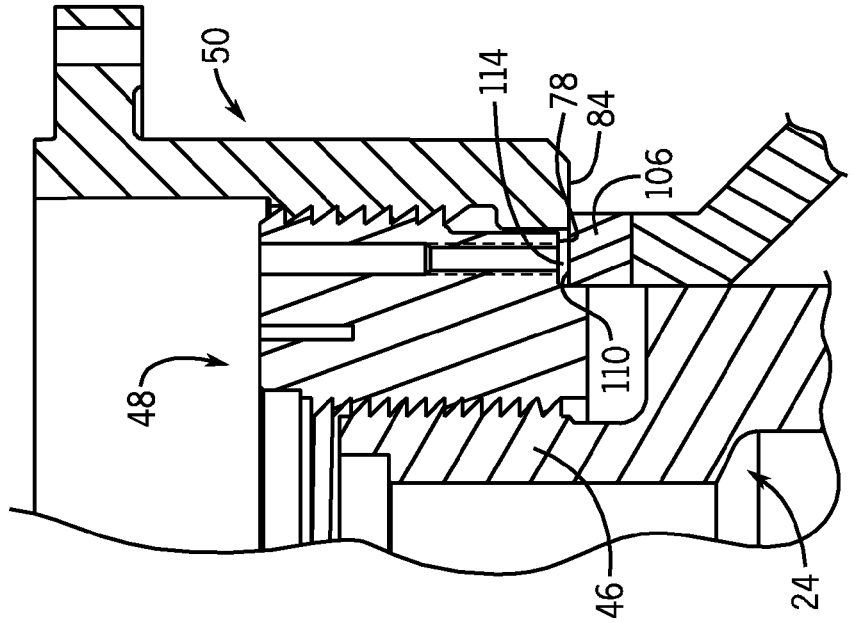
FIG. 8 is a partial section view illustrating the downward movement of the outer nut along the inner nut and into contact with the torch ring.

Once the jackscrews 52 have been properly tightened, the outer nut 50 is rotated relative to the inner nut 48 until the bottom face surface 84 contacts the top surface 110 of the torch ring 106, as shown in FIG. 8. The outer nut 50 can be turned down along the inner nut 48 using many different mechanisms. However, it is contemplated that since the jackscrews 52 create the required locking force, the outer nut 50 can be turned down by hand using a pry bar and associated accessories until the bottom face surface 84 contacts the top surface 110 of the torch ring 106.

Figure 9:
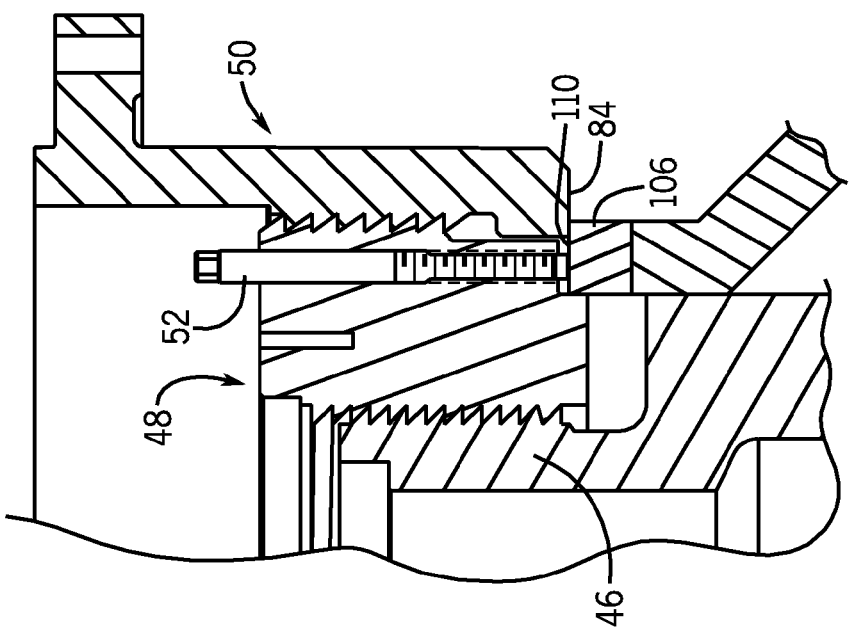
FIG. 9 is a partial section view illustrating the removal of the jackscrews.

Once the bottom face surface 84 of the outer nut 50 contacts the top surface 110 of the torch ring 106, each of the jackscrews 52 can be removed from the inner nut 48, as can be seen in a comparison between FIGS. 8 and 9. Preferably, the jackscrews are removed in the incremental star pattern described above to avoid any overloads on the last jackscrews to be removed. When the jackscrews 52 are removed, most or all of the locking force between the attachment portion 46 of the head assembly 24 and the inner nut 48 is maintained by the contact between the outer nut 50 and the torch ring 106. As illustrated in FIG. 9, the gap 114 remains between the jackscrew exit surface 78 and the top surface 110 once the outer nut 50 has been turned down into the position shown in FIG. 9. Thus, the outer nut 50 maintains the locking force created by applying a small torque to each of the set of jackscrews 52 without requiring a large torque being applied to either the inner nut 48 or the outer nut 50.

Once the locking nut assembly is in position to hold the mantle on the head assembly, a head lift plate (not shown) is attached to the inner nut. The head lift plate includes a lift eye or a hoist ring that allows the entire head assembly with the installed mantle and locknut assembly to be lifted and inserted into the crusher.

Figure 10:
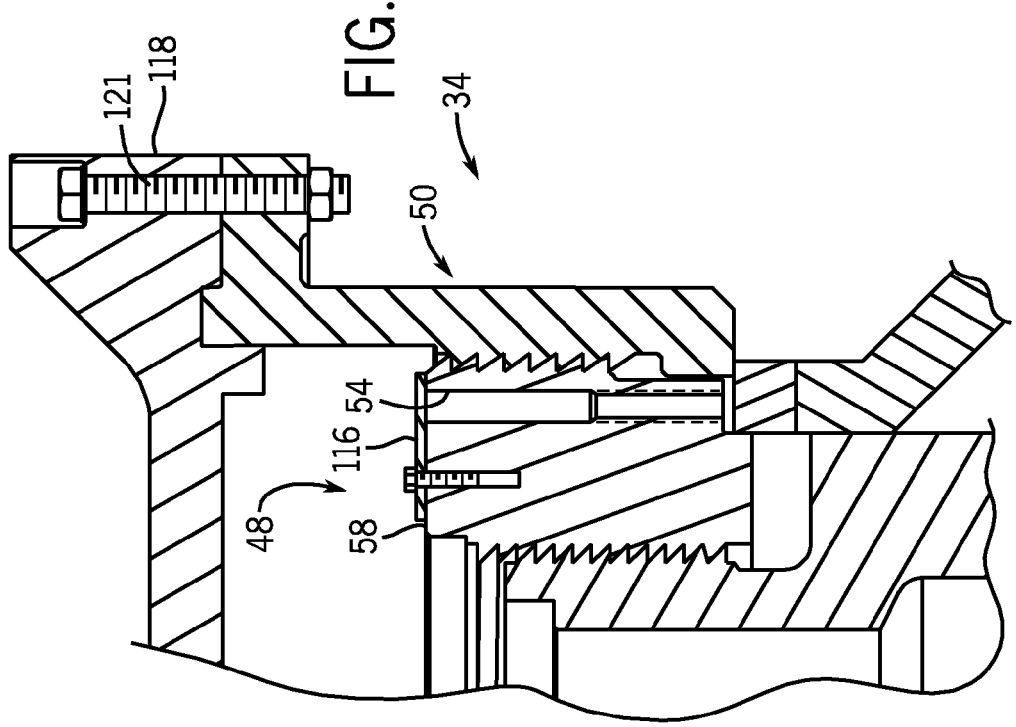
FIG. 10 is a partial section view illustrating the installation of both the cover plate and the feed plate to the locking nut assembly.

Once the entire head assembly is in position within the crusher, the head lift plate is removed and a cover plate 116 can be attached to the top face surface 58 of the inner nut 48 to cover the series of axial bores 54, as shown in FIG. 10. The cover plate 116 prevents debris from entering into the axial bores 54 during use of the crusher.

Once the cover plate 116 has been installed, a feed plate 118 can be attached to the outer nut 50 through a series of threaded fasteners 121. As described previously, the feed plate 118 is a wear protection device that can be removed and replaced when needed.

Figure 11:
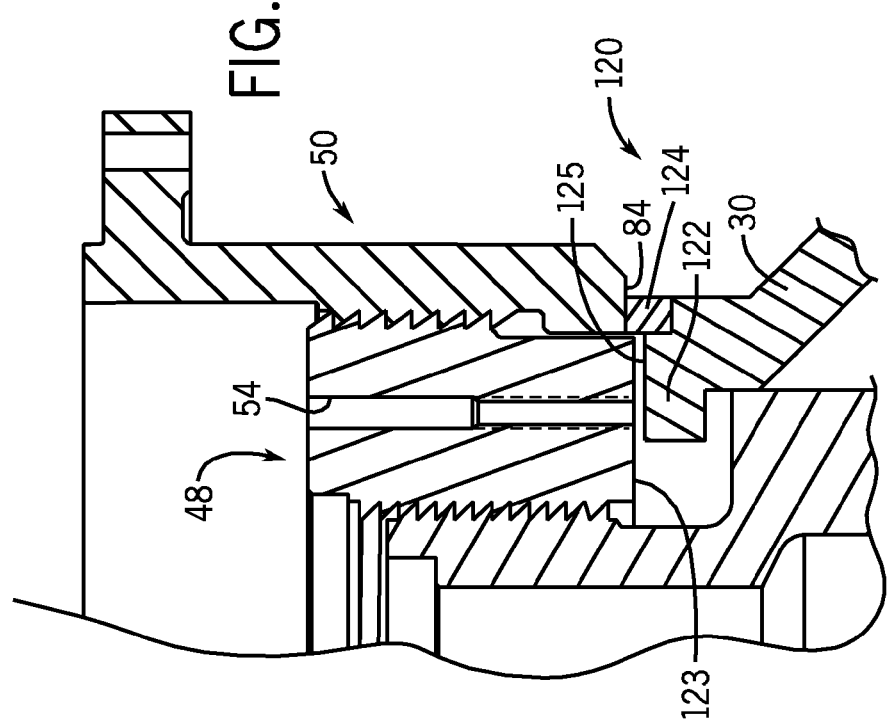
FIG. 11 is a section view of an alternate embodiment of the mantle and locking nut assembly.

FIG. 11 illustrates an alternate embodiment of the locking nut assembly of the present disclosure. In the alternate embodiment shown in FIG. 11, the mantle 30 includes an engagement portion 122 that protrudes inwardly. The engagement portion 122 is positioned beneath each of the axial bores 54 formed in the inner nut 48 such that when the jackscrews (not shown) are received in the axial bores 54 and tightened, the contact end of each jackscrew contacts the engagement portion 122. During the installation of the locking nut assembly, the inner nut 48 is turned down only far enough until a small gap exists between the bottom face surface 123 and the top surface 125 of the engagement portion 122 of the mantle 30. The small gap will reduce the probable tendency for binding to occur at the bottom face surface 123 at disassembly for installation of a new mantle. The gap will reduce the cutting required to remove a worn mantle. In the embodiment shown in FIG. 11, the inner nut 48 does not include the recessed jackscrew exit surface as in the embodiment of FIGS. 4-10. Instead, each of the axial bores 54 extends through the bottom face surface 123.

After the jackscrews are tightened in the same manner previously described, the outer nut 50 is turned down along the inner nut 48 until the bottom face surface 84 contacts the torch ring 124. The torch ring 124 is received in a groove formed in the mantle 30. The locking nut assembly functions in the same way as described previously except that the jackscrews engage the mantle 30 directly, rather than the torch ring.

FIG. 12 illustrates another alternate embodiment of the locking nut assembly of the present disclosure. In the embodiment shown in FIG. 12, the mantle 30 includes an engagement portion 130 that protrudes radially inward. The engagement portion 130 is positioned beneath each of the axial bores 54 formed in the inner nut 48 such that when the jackscrews (not shown) are received in the axial bores 54, the contact end of each jackscrew contacts a top surface 132 of the engagement portion 130.

After the series of jackscrews are tightened in the same manner previously described, the outer nut 50 is turned down along the inner nut 48 until the bottom face surface 84 contacts the top surface 132 of the mantle 30. The torch ring 124 shown in FIG. 11 is eliminated in the embodiment of FIG. 12 such that both the jackscrews and the outer nut 50 contact the top surface 132 of the mantle 30 directly. The two-piece locking nut functions in the same way as described previously except that the jackscrews and the outer nut 50 engage the mantle 30 directly. It is contemplated that the inner nut 48 is turned down only far enough until a small gap exists between the jackscrew exit surface 78 and the top surface 132 of the mantle 30. The initial gap will reduce the probable tendency for binding to occur at the jackscrew exit surface at disassembly for installation of a new mantle. The gap will reduce the cutting required to remove a worn mantle 30.

In the embodiment shown in FIG. 12, the outer nut 50 does not include an attachment flange 86, as was the case in the embodiment of FIG. 4. Instead, the outer nut 50 includes a notch 134 formed in the outer surface 136. The notch 134 provides access to an open shaft 138 that extends through the top surface 140. The top surface 140, in turn, receives a feed plate 142. The feed plate 142 includes a series of recessed regions 144 that each receive the head of a threaded fastener (not shown) such that the feed plate 142 can be securely attached to the outer nut 50.

We claim:

1. A method of securing a mantle to a head assembly of a cone crusher, comprising:
    providing a locking nut assembly having an inner nut having a plurality of axial bores and an outer nut that is movable relative to the inner nut;
    attaching the inner nut of the locking nut assembly to the head assembly of the crusher;
    inserting a plurality of jackscrews into the axial bores of the inner nut;
    moving the plurality of jackscrews relative to the inner nut such that the jackscrews exert a first three on the mantle to create a locking force between the locking nut assembly and the head assembly;
    moving the outer nut along the inner nut until the outer nut exerts a second force on the mantle; and
    moving the plurality of jackscrews away from the mantle to eliminate the first force exerted by the plurality of jackscrews on the mantle such that only the outer nut exerts the locking force.

2. The method of claim 1 further comprising the step of removing the jackscrews from the inner nut.

3. The method of claim 1 wherein a torch ring is positioned on the mantle and both the plurality of jackscrews and the outer nut engage the torch ring.

4. The method of claim 1 wherein each of the axial bores includes a series of internal threads that engage external threads on each of the jackscrews, wherein the jackscrews are each rotated relative to the inner nut to move the jackscrews to create the locking force.

5. The method of claim 1 wherein the inner nut includes a threaded outer surface that engages a threaded inner surface of the outer nut, wherein the outer nut is rotated relative to the inner nut to move the outer nut to engage the mantle.

6. The method of claim 1 wherein the inner nut includes a threaded inner surface that engages a threaded outer surface of the head assembly, wherein the locking force secures the inner nut to the head assembly.

7. The method of claim 1 wherein the step of attaching the inner nut of the locking nut assembly to the head assembly of the crusher includes rotating the inner nut relative to the head assembly to move the inner nut toward a torch ring positioned on the mantle.

8. The method of claim 7 wherein the inner nut of the locking nut assembly is moved into engagement with the torch ring prior to the plurality of jackscrews creating a locking force between the locking nut assembly and the head assembly.

9. A method of securing a mantle to a head assembly of a cone crusher, comprising:
    providing a locking nut assembly having an inner nut having a plurality of axial bores and an outer nut that is movable relative to the inner nut, wherein the inner nut includes a threaded outer surface that engages a threaded inner surface of the outer nut, wherein the outer nut is rotated relative to the inner nut to move the outer nut to engage the mantle;
    attaching the inner nut of the locking nut assembly to the head assembly of the crusher;
    moving a plurality of jackscrews within the axial bores of the inner nut such that the jackscrews exert a first force on the mantle to create a locking force between the locking nut assembly and the head assembly;
    moving the outer nut along the inner nut until the outer nut exerts a second force on the mantle; and
    moving the plurality of jackscrews away from the mantle to eliminate the first force exerted by the plurality of jackscrews on the mantle such that only the outer nut exerts the locking force.

10. The method of claim 9 further comprising the step of removing the jackscrews from the inner nut.

11. The method of claim 9 wherein a torch ring is positioned on the mantle and both the plurality of jackscrews and the outer nut engage the torch ring.

12. The method of claim 9 wherein each of the axial bores includes a series of internal threads that engage external threads on each of the jackscrews, wherein the jackscrews are each rotated relative to the inner nut to move the jackscrews to create the locking force.

13. The method of claim 9 wherein the inner nut includes a threaded inner surface that engages a threaded outer surface of the head assembly, wherein the locking force secures the inner nut to the head assembly.

14. The method of claim 13 wherein the step of attaching the inner nut of the locking nut assembly to the head assembly of the crusher includes rotating the inner nut relative to the head assembly to move the inner nut toward a torch ring positioned on the mantle.

15. The method of claim 14 wherein the inner nut of the locking nut assembly is moved into engagement with the torch ring prior to the plurality of jackscrews creating a locking force between the locking nut assembly and the head assembly.

* * * * *